United States Patent Office 3,746,746
Patented July 17, 1973

3,746,746
METHOD OF PREPARING ORGANIC ISOCYANATES
Angelo S. Pagano, Doylestown, Pa., assignor to Rohm and Haas Company, Philadelphia, Pa.
No Drawing. Original application June 27, 1968, Ser. No. 740,479. Divided and this application Mar. 1, 1971, Ser. No. 120,047
Int. Cl. C07c *119/04*
U.S. Cl. 260—478          5 Claims

ABSTRACT OF THE DISCLOSURE

Isocyanates are prepared from their corresponding amines or amino-containing compounds in a phosgenation reaction, employing a small but catalytically effective amount of an N,N-dialkyl amide catalyst.

CROSS REFERENCE TO RELATED APPLICATION

This application is a division of copending application Ser. No. 740,479, filed on June 27, 1968.

This invention relates to the preparation of isocyanates and more particularly to the preparation of isocyanates from the corresponding amines or amino-containing compounds with aid of a catalyst.

It has previously been known that isocyanates may be prepared by reacting a primary amine with phosgene. The amine is usually employed in the form of its hydrochloride, although the free amine has been used in some cases. In place of phosgene, materials which liberate phosgene during the reaction may also be used. These previously known methods have not been entirely satisfactory, however, since in some cases the yield is not sufficient and in others the time of reaction is unduly long.

One of the principal objects of the present invention is to produce isocyanates from the corresponding amines or amino-containing compounds in good yields and in reasonable times by the use of a catalyst. Other objects and advantages will appear as the description proceeds.

According to the practice of the invention, the amine, which may be in the form of the free amine, the hydrochloride, or other salt form, is reacted with phosgene in the presence of a relatively small amount of a N,N-dialkyl amide as a catalyst. Hydrogen chloride is eliminated and the amine or amino-containing compound is converted to the corresponding isocyanate. In general, the conditions of reaction as to temperature, pressure, proportions, etc. are similar to those previously employed without the catalyst, but by the use of the catalyst, the yields are improved and the time of reaction is greatly shortened.

The N,N-dialkyl amide catalyst which is used in the present invention is tris(dimethylamino)phosphine, $P[N(CH_3)_2]_3$. The catalyst is ordinarily used in a small but effective amount; this will generally vary between about 0.001 weight percent to 20 weight percent of catalyst, preferably 0.05 to 10 weight percent of catalyst, based on the weight of the amine or amino-containing compound.

It is also known to prepare mono-acyloxyethylamine hydrochlorides, according to the method of Wystrach et al., U.S. Pat. 2,626,278 and diamine dihydrochlorides according to Belgian Pat. 633,465, and to convert these amines or amino-containing compounds to their corresponding isocyanates or diisocyanates by reaction with phosgene. In copending U.S. patent applications 518,977 filed Jan. 6, 1966 and 519,001 filed Jan. 6, 1966, now United States Pat. 3,468,934, granted Sept. 23, 1969, which are in the hands of a common assignee and which are herein incorporated by reference, there is disclosed the preparation of hydrochloride salts of ester amines by means of direct esterification of saturated carboxylic or amino-acids with alkanolamine hydrochloride in the presence of an excess of hydrogen chloride, and in copending application Ser. No. 740,480, filed June 27, 1968, by Sheldon N. Lewis and Jerome F. Levy, said application being entitled "Method of Preparing Novel Sulfonic Acid Salts of Acyloxyalkylamines and Compounds Therefrom" which is in the hands of a common assignee and which is incorporated herein by reference, there is disclosed the preparation of acyloxyalkylamine sulfonic acid salts by reaction of an organic acid or amino-acid with a sulfonic acid salt of an alkanolamine. All of the amines or amino-containing compounds of the above patents and patent applications which are convertible to the corresponding isocyanates, as well as others by reaction with phosgene, are useful in the present invention, i.e., the catalysts of the present invention are of general use with the amines or amino-containing compounds of the prior art, as well as others, in their conversion to the corresponding isocyanates. Thus, the amines or amino-containing compounds are not critical with respect to their chemical makeup and they may be either aliphatic or aromatic in character for use in the present invention.

In converting the amine or amino-containing compound to the corresponding isocyanates, the conversion is carried out with phosgene or other carbonyl dihalide such as carbonyl bromide, in the presence of an inert organic liquid reaction medium and one or more the N,N-dialkylamides, above-mentioned, as a catalyst. Typically, the amine or amino-containing compound is dispersed in the liquid reaction medium and phosgene added, either in its liquid or gaseous form, preferably in excess of that needed to react quantitatively with the amino groups, and the temperature of the reaction medium maintained from about 60° C. to about 225° C. The molar ratio of phosgene:amine or amino-containing compound may be from 1.1:1 to 10:1 and preferably is at least 2:1. Suitable liquid reaction media include aromatic hydrocarbons, chlorinated aromatic hydrocarbons, chlorinated aliphatic hydrocarbons, etc.; specific examples include benzene, monochlorobenzene, dichlorobenzene, toluene, xylene, cyclohexane, carbon tetrachloride, tertiachloroethylene, amylbenzenes, cymenes, etc.

The practice of the invention is illustrated by the following examples, in which all parts and percentages are by weight, and all temperatures in degrees centigrade, unless otherwise mentioned.

EXAMPLE 1

Hexyl isocyanate from hexylamine hydrochloride

To a 1-liter, 4-necked, round-bottomed flask fitted with a mechanical stirrer, a gas inlet tube, a thermometer, and a condenser are charged 202 g. (2.0 moles) of hexylamine and 300 ml. of benzene. An excess of hydrogen chloride is passed in with external cooling of the mixture is an ice bath. Then the mixture is heated to reflux and phosgene is bubbled in at the rate of 1.0 mole/hr. until the phosgenation is complete (according to vapor phase chromatographic analysis) and then for one hour more. The product, hexyl isocyanate, is isolated by distillation through a 10-plate Oldershaw column, B.P. 70-80° (15-20 mm.), assay 98.5% pure by analysis for isocyanate by the butylamine titration method (W. J. Remington, E. I. du Pont de Nemours, Eastman Chemicals Dept., Paint Bulletin PB-5).

In a catalyzed run, dimethylformamide, 1.5 g. (0.02 mole) is added just prior to beginning the phosgenation. Otherwise, the procedure is identical to the uncatalyzed run. The yield of hexyl isocyanate is 98–99% in both the catalyzed and uncatalyzed runs.

| Dimethylformamide catalyst level: | Time required for completion of phosgenation, hr. |
|---|---|
| None | 5.5 |
| 1 mole-percent | 4.5 |

EXAMPLE 2

Bis-2-isocyanatoethyl fumarate from bis-2-aminoethyl fumarate dihydrochloride

Bis-2-aminoethyl fumarate dihydrochloride is prepared by the procedure described in French Patent No. 1,370,-869 and purified by recrystallization from ethanol.

Sixty-eight and eight-tenths grams (0.25 mole) of bis-2-aminoethyl fumarate dihydrochloride is suspended in 700 g. of chlorobenzene. With agitation, phosgene is passed in at the rate of 0.5 mole/hr. until the reaction is complete. The reaction is followed by vapor phase chromatography (VPC), and is complete in 39.5 hr.

A second run is made under identical conditions, except for the addition of 1.16 ml. (0.015 mole, 3 mole percent calculated on ammonium groups) of dimethylformamide after the first hour of phosgenation. The phosgenation is complete in 8 hours.

From initial slopes of plots of the amounts of bis-2-isocyanatoethyl fumarate that are formed (as determined by VPC) in the catalyzed and uncatalyzed reaction mixtures as a function of time, the initial rate of phosgenation in the catalyzed reaction is approximately 2.7–2.9 times faster than the uncatalyzed reaction.

The product (isolated from the catalyzed reaction mixture) is purified by recrystallization from a hexane-benzene mixture, M.P. 53–55°.

EXAMPLE 3

Preparation of 2,4-diisocyanatotoluene from 2,4-diaminotoluene

Sixty-one grams (0.50 mole) of 2,4-diaminotoluene are dissolved in 570 g. of toluene. Dry hydrogen chloride is passed in at a rate of 0.5 mole/hr. for 1.5 hr. while the temperature of the mixture is cooled so as to keep it at around 70° during most of the salt formation. The reaction mixture is then phosgenated at 105–106° until VPC analysis indicates the reaction is complete (ca. 25 hr.), with phosgene bubbling in at the rate of 1.0 mole/hr.

A second run was made under identical conditions except for the addition of 7.6 ml. (0.10 mole, 10 mole percent based on the ammonium groups present) of dimethylformamide at the start of the phosgenation.

From initial slopes of plots of the relative toluenediisocyanate content (as determined by VPC) in both the catalyzed and uncatalyzed reactions as a function of time, it appears that the initial rate of phosgenation (over the first 2 hr.) is 20% faster in the catalyzed run.

EXAMPLES 4–8

2-isocyanatoethyl 6-isocyanatocaproate from 2-aminoethyl 6-aminocaproate dihydrochloride with various catalysts The examples tabulated below for the preparation of 2-isocyanatoethyl 6-isocyanatocaproate all use the same general procedure, which consists of bubbling phosgene into a suspension of the diamine dihydrochloride in o-dichlorobenzene at 135°. Catalysts are added either all at once at the beginning of the phosgenation or in portions over the first 0.5 to 4.0 hrs. Approximately 640–760 grams of o-dichlorobenzene are used per mole of diamine dihydrochloride. Each reaction uses between 0.77 and 1.0 mole of purified (by crystallization from a solvent) diamine hydrochloride starting material. The phosgene flow rate is 0.6 mole/hr. per mole of diamine dihydrochloride.

Other work has shown that in this particular system, the reaction is complete when the suspended solid (diamine dihydrochloride) just disappears. This criterion was used to estimate the time for complete reaction to occur.

| Ex. | Catalyst | Catalyst level, moles per equiv. of amine hydrochloride | Time for complete reaction, hr. |
|---|---|---|---|
| 4 | None | None | 21.3 |
| 5 | Dimethylformamide | 0.010 | 7.8 |
| 6 | Chloromethylenedimethylammonium chloride. | .010 | 8.5 |
| 7 | Tetramethylurea | .015 | 8.0 |
| 8 | Tris-(dimethylamino)-phosphine | .009 | 14.0 |

EXAMPLE 9(a)

Preparation of 2-isocyanatoethyl methacrylate from 2-aminoethyl methacrylate, p-chlorobenzenesulfonic acid salt A 1-liter, 5-necked flask is fittted with a mechanical stirrer, a gas inlet tube, and a thermometer. The flask was charged with 162 g. (0.050 mole) of pure 2-aminoethyl methacrylate, p-chlorobenzenesulfonic acid salt (prepared as in the copending application of Lewis and Levy, hereinabove mentioned, and filed concurrently with the present application), 250 g. of heptane, 50 g. of 1,2-dichloroethane, 3.5 g. of dimethylformamide, and 1 g. of diphenylphenylenediamine.

Air (20 ml./min.) and phosgene (0.5 mole/hr.) are passed into the stirred mixture at 70° until the phosgenation is complete (ca. 6 hr.). Vapor phase chromatographic analysis at this time indicates the yield of 2-isocyanatoethyl methacrylate to be essentially quantitative.

The yield is significantly better and the time of phosgenation is shortened as compared with the reaction being carried out without the dimethylformamide catalyst.

(b) The phosgenation procedure is repeated with the bis-benzene sulfonic acid salt of 2-aminoethyl 6-aminocaproate (prepared according to the teachings of the copending Lewis and Levy application, above-noted, and filed concurrently with the present application) employing xylene as the inert liquid reaction media, carrying out the phosgenation at 100°–115°; and using dimethylformamide as the catalyst. Phosgenation is complete in about 10–13 hours and yield of 2-isocyanatoethyl, 6-isocyanatocaproate is in the range of 70–90 percent. The yield is higher, and the time of phosgenation is shorter, as compared to the phosgenation being carried out without the dimethylformamide catalyst.

Isocyanates are very reactive materials which readily condense with active hydrogen-containing compounds such as alcohols, amines, carboxylic acids, amides etc. to form useful carbamates, ureas and the like. The isocyanates may be used as cross-linking agents for polymers containing active hydrogen groups, may be reacted with low-molecular weight polymers containing active hydrogen groups such as hydroxyl-terminated polyesters or polyethers to produce polyurethanes, and may be added to polymeric coating compositions to improve the adhesion thereof to a variety of substrates. They are also useful as modifying agents in producing other compounds useful as modifying agents for textiles, cellulose, starch, polyvinyl alcohol, algin, etc.

What is claimed is:

1. In a process for preparing an organic isocyanate by reacting a primary amine or a primary amino-containing compound with phosgene in an inert liquid reaction medium, the improvement which comprises carrying out the reaction in the presence of an effective amount of tris-(dimethylamino)phosphine as a catalyst.

2. Process according to claim 1 in which the catalyst is present in an amount of about 0.001 to 20 weight percent based on the weight of amino or amino-containing compound.

3. Process according to claim 1 wherein the reaction is carried out at a temperature between about 60° C. to about 225° C. and the molar ratio of phosgene:amine or amino-containing compound is from 1.1:1 to about 10:1.

4. Process according to claim 1 in which the amino compound is 2-aminoethyl 6-aminocaproate.

5. Process according to claim 1 in which the amino compound is 2-aminoethyl methacrylate.

References Cited
UNITED STATES PATENTS 3,290,288 12/1966 Oertel et al. _____ 260—453 X
2,362,648 11/1944 Lichty et al. _____ 260—453

LEWIS GOTTS, Primary Examiner

D. H. TORRENCE, Assistant Examiner

U.S. Cl. X.R.

260—485 R, 486 R, 453 PH